United States Patent

Aburai

(10) Patent No.: US 10,886,577 B2
(45) Date of Patent: Jan. 5, 2021

(54) CHARGING DEVICE OF VEHICLE

(71) Applicant: Toyota Jidosha Kabushiki Kaisha, Toyota (JP)

(72) Inventor: Noriaki Aburai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 139 days.

(21) Appl. No.: 16/210,508

(22) Filed: Dec. 5, 2018

(65) Prior Publication Data

US 2019/0190086 A1 Jun. 20, 2019

(30) Foreign Application Priority Data

Dec. 14, 2017 (JP) .................. 2017-239599

(51) Int. Cl.
*H01M 10/44* (2006.01)
*H02J 7/00* (2006.01)
*B60L 53/20* (2019.01)

(52) U.S. Cl.
CPC .......... *H01M 10/441* (2013.01); *B60L 53/20* (2019.02); *H02J 7/0077* (2013.01); *B60L 2260/42* (2013.01)

(58) Field of Classification Search
CPC ...... B60L 53/20; B60L 58/24; B60L 2260/42; B60L 2260/46; H02J 7/0077; H01M 10/441; Y02T 90/14

USPC ......................................................... 320/128
See application file for complete search history.

(56) References Cited

U.S. PATENT DOCUMENTS

2014/0015485 A1   1/2014   Mitsutani et al.
2017/0010331 A1*  1/2017   Mano .................... B60L 58/24

FOREIGN PATENT DOCUMENTS

JP        2012217234 A      11/2012

* cited by examiner

*Primary Examiner* — Paul Dinh
(74) *Attorney, Agent, or Firm* — Dinsmore & Shohl LLP (57) ABSTRACT

A charging device includes: a power storage device including a plurality of assembled batteries connected to an inlet in parallel; a plurality of current sensors each configured to detect current flowing in a corresponding one of the plurality of assembled batteries; a plurality of relays each provided between a corresponding one of the plurality of assembled batteries and a corresponding one of the plurality of current sensors; and an ECU configured to perform offset learning to learn offset values of the plurality of current sensors. When the ECU determines that it is in one of first to fourth states, the ECU is configured to cut off one SMR relay in the plurality of SMR relays, and perform the offset learning for the current sensor corresponding to this SMR relay.

3 Claims, 4 Drawing Sheets

CHARGING DEVICE OF VEHICLE

CROSS REFERENCE TO RELATED APPLICATIONS

This nonprovisional application claims priority to Japanese Patent Application 2017-239599 filed on Dec. 14, 2017, with the Japan Patent Office, the entire contents of which are hereby incorporated by reference.

BACKGROUND

Field

The present disclosure relates to a charging device of a vehicle, by which a power storage device mounted thereon can be charged using a power supply external to the vehicle.

Description of the Background Art

Japanese Patent Laying-Open No. 2012-217234 discloses a charging device of a vehicle that performs offset correction for current sensors each configured to detect current sent to and received from a power storage device mounted thereon. This charging device of the vehicle is configured to receive power supplied from a power supply (hereinafter, referred to as "external power supply") external to the vehicle and charge the power storage device. It should be noted that in the description below, the charging of the power storage device with the power supplied from the external power supply is also referred to as "external charging". The charging device of the vehicle learns an offset value of each current sensor when the charging device determines that all of the in-vehicle devices operating during the external charging are halted. The charging device of the vehicle uses the learned offset value to perform offset correction assuming the offset value as a reference (zero).

SUMMARY

In the charging device of the vehicle disclosed in Japanese Patent Laying-Open No. 2012-217234, in order to perform a process (hereinafter, also referred to as "offset learning") for learning the offset value for performing the offset correction for the current sensor, all of the in-vehicle devices operating during the external charging have to be halted. Accordingly, during the offset learning, the power storage device cannot be charged from or discharged to the external power supply.

The present disclosure has been made to solve the above-described problem, and has an object to charge or discharge a power storage device from or to an external power supply during offset learning for a current sensor.

A charging device of a vehicle according to the present disclosure includes: a connector connectable to a power supply external to the vehicle; a power storage device including a plurality of assembled batteries connected to the connector in parallel; a plurality of current sensors each configured to detect current flowing in a corresponding one of the plurality of assembled batteries; a plurality of relays each provided between a corresponding one of the plurality of assembled batteries and a corresponding one of the plurality of current sensors; and a controller configured to perform offset learning to learn offset values of the plurality of current sensors. When all of the plurality of relays are in a close state and a magnitude of charging current supplied from the power supply to the power storage device or a magnitude of discharging current supplied from the power storage device to the power supply is smaller than a predetermined value, the controller is configured to bring one or more relays of the plurality of relays into an open state and perform the offset learning for one or more current sensors corresponding to the one or more relays in the open state.

According to the above-described configuration, when the magnitude of the charging current or the magnitude of the discharging current is smaller than the predetermined value, the charging device of the vehicle brings the one or more relays into the open state to disconnect the corresponding one or more assembled batteries from the external power supply, and performs the offset learning for the one or more current sensors corresponding to the disconnected one or more assembled batteries. On the other hand, the charging device of the vehicle maintains the relay(s) other than the one or more relays in the open state to be in the close state, whereby charging or discharging can be continued. Accordingly, even during the offset learning for the current sensors, charging or discharging can be performed between the external power supply and the power storage device.

When the magnitude of the charging current or the magnitude of the discharging current is larger than the predetermined value, the controller is configured to maintain all of the plurality of relays to be in the close state without performing the offset learning.

According to the above-described configuration, when the magnitude of the charging current or the magnitude of the discharging current is larger than the predetermined value, the charging or discharging precedes the offset learning. Generally, in the case where the offset learning is performed, charging time or discharging time for the power storage device becomes longer than that in the case where the offset learning is not performed. Only when the magnitude of the charging current or the magnitude of the discharging current is smaller than the predetermined value set to fall within a range that can less affect the charging time or the discharging time, the offset learning is performed. Accordingly, the charging time or the discharging time can be suppressed from being increased, thereby suppressing the user from feeling unpleasant.

When there is a relay unable to be brought into the open state, the controller is configured not to perform the offset learning for a current sensor corresponding to the relay unable to be brought into the open state.

When there is a relay unable to be brought into the open state because the relay fails, for example, the relay is fixed to the ON state or the relay is in an uncontrollable state, even if the offset learning for the current sensor corresponding to the relay is performed, the learned offset value is highly likely to include an error, with the result that a precise offset value may be unable to be learned. Therefore, the offset learning is not performed in the above-described case in order to suppress the offset correction for the current sensor from being performed using such an offset value including an error.

The foregoing and other objects, features, aspects and advantages of the present disclosure will become more apparent from the following detailed description of the present disclosure when taken in conjunction with the accompanying drawings.

DESCRIPTION OF THE EMBODIMENTS

The following describes the present embodiment with reference to figures in detail. It should be noted that the same or corresponding portions in the figures are given the same reference characters and ax not described repeatedly.

Figure 1:
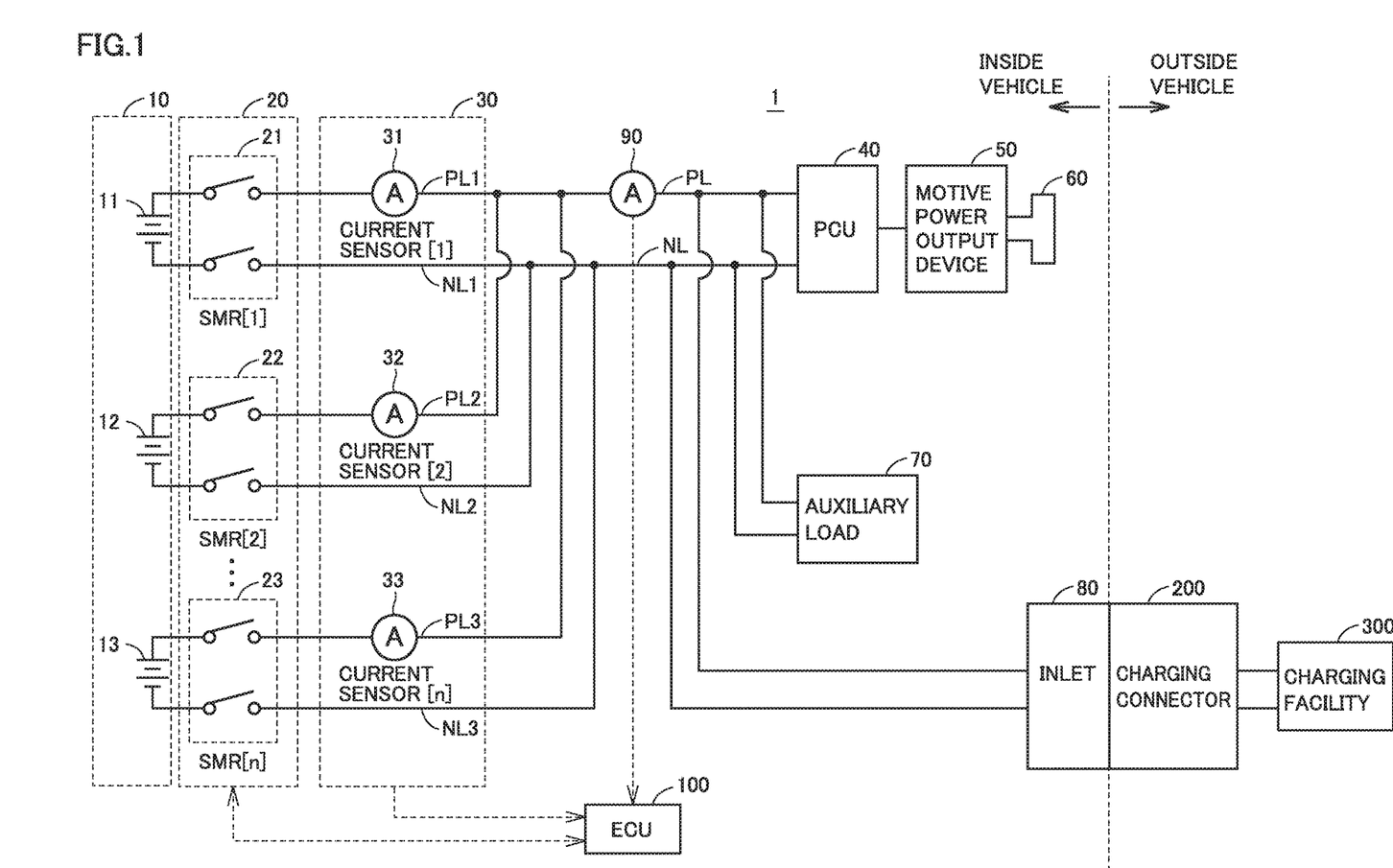
FIG. 1 is an entire configuration diagram of a charging system including a vehicle and a charging facility according to the present embodiment.

FIG. 1 is an entire configuration diagram of a charging system including a vehicle 1 and a charge facility 300 according to the present embodiment. Vehicle 1 according to the present embodiment includes: a power storage device 10 including a plurality of assembled batteries; a power control unit (hereinafter, also referred to as "PCU) 40; a motive power output device 50; driving wheels 60; an auxiliary load 70; an inlet 80; an ECU (Electronic Control Unit) 100; a relay device 20 including a plurality of SMR relays; a current monitoring device 30 including a plurality of current sensors; and a current sensor 90. It should be noted that in the present embodiment, DC charging will be illustratively described in which vehicle 1 receives DC power supplied from charging facility 300 to charge power storage device 10; however, the present disclosure is also applicable to AC charging in which vehicle 1 receives AC power supplied from charging facility 300 to charge power storage device 10.

It will be illustratively described that in vehicle 1 according to the present embodiment, n assembled batteries are included in power storage device 10, n SMR relays are included in relay device 20, and n current sensors are included in current monitoring device 30. The plurality of assembled batteries included in power storage device 10 according to the present embodiment are connected to inlet 80 in parallel. FIG. 1 representatively shows assembled batteries 11, 12, 13 connected to inlet 80 in parallel.

Moreover, in vehicle 1 according to the present embodiment, a current sensor 31 is connected to one assembled battery 11 via an SMR relay 21, and is configured to detect current flowing in assembled battery 11. Similarly, a current sensor 32 is connected to an assembled battery 12 via an SMR relay 22, and is configured to detect current flowing in assembled battery 12. Thus, the n current sensors are similarly connected to detect respective currents flowing in the n assembled batteries. In the description below, assembled battery 11, SMR relay 21, and current sensor 31 will be representatively described with regard to the plurality of assembled batteries included in power storage device 10, relay device 20, and current monitoring device 30. It should be noted that in the description below, the i-th ($1 \leq i \leq n$) assembled battery, SMR relay, and current sensor may be described as assembled battery [i], SMR relay [i], and current sensor [i], for example.

Assembled battery 11 is a rechargeable DC power supply, and is constituted of a secondary battery such as a nickel-metal hydride battery or a lithium ion battery, for example. Assembled battery 11 stores power supplied from the external power supply via inlet 80 as well as power generated by motive power output device 50. It should be noted that a large-capacity capacitor can be also employed as assembled battery 11.

PCU 40 generally represents a power conversion device for receiving power from power storage device 10 to drive motive power output device 50. For example, PCU 40 includes: an inverter for driving a motor included in motive power output device 50; a converter configured to boost power output from power storage device 10 and supply the power to the inverter; and the like.

Motive power output device 50 generally represents a device configured to drive driving wheels 60. For example, motive power output device 50 includes a motor, an engine, or the like each configured to drive driving wheels 60. Moreover, when the motor configured to drive driving wheels 60 operates in a regenerative mode, motive power output device 50 generates electric power during braking of the vehicle and outputs the generated electric power to PCU 40.

Auxiliary load 70 is connected to a positive electrode line PL and a negative electrode line NL each connected to power storage device 10. This auxiliary load 70 generally represents an auxiliary device that operates during the external charging, and includes: a DC/DC converter configured to generate voltage for the auxiliary device by stepping down voltage of positive electrode line PL; an air conditioner; and the like, for example.

Inlet 80 is connectable to a charging connector 200 of charging facility 300 configured to supply power to vehicle 1. During the external charging, inlet 80 receives power supplied from charging facility 300. It should be noted that inlet 80 according to the present embodiment corresponds to a "connector" according to the present disclosure.

Current sensor 31 is provided at a positive electrode line PL1 branched from positive electrode line PL, detects current IB1 flowing in assembled battery 11, and outputs the detection value to ECU 100. It should be noted that in the present embodiment, it is illustratively described that current sensor 31 is provided at branched positive electrode line PL1; however, current sensor 31 may be provided at a negative electrode line NL1 branched from negative electrode line NL.

Current sensor 90 is provided at positive electrode line PL, detects current IB flowing in power storage device 10, and outputs the detection value to ECU 100. Specifically, current sensor 90 detects: charging current supplied from the external power supply to charge power storage device 10; and discharging current supplied from the power storage device to the external power supply. It should be noted that in the present embodiment, it is illustratively described that current sensor 90 is provided at positive electrode line PL; however, current sensor 90 may be provided at negative electrode line NL.

ECU 100 performs a predetermined calculation using the detection value obtained from current sensor 31 and current sensor 90, and performs various processes. Specifically, for example, ECU 100 determines whether to perform the offset learning using detection value IB of current sensor 90. Moreover, ECU 100 learns detection value IB1 of current sensor 31 as an offset value (offset learning), and then performs the offset correction for current sensor 31 using the learned offset value. It should be rioted that the ECU according to the present embodiment corresponds to a "controller" according to the present disclosure.

In order to perform precise offset learning for current sensor 31, ECU 100 of vehicle 1 desirably halts all of the in-vehicle devices operating during the external charging. However, when all of the in-vehicle devices operating during the external charging are halted as described above, the charging and discharging between power storage device 10 and the external power supply cannot be carried out during the offset learning.

Therefore, in the present embodiment, when ECU 100 determines that vehicle 1 is in one of below-described first to fourth states. ECU 100 sequentially performs the offset learning for the current sensors from one current sensor to another current sensor. Accordingly, even during the offset learning, each of assembled batteries corresponding to current sensors other than the current sensor being subjected to the offset learning can be charged from or discharge to the external power supply.

The first state is a state in which vehicle 1 stands by for DC charging or DC discharging. The second state is a state in which DC charging of power storage device 10 is being performed in vehicle 1 and the magnitude of charging current IB for charging power storage device 10 is smaller than a predetermined value. The third stale is a state in which DC discharging of power storage device 10 is being performed in vehicle 1 and the magnitude of charging current IB for supplying electric power from power storage device 10 to the external power supply is smaller than the predetermined value. The fourth state is a state in which neither of the DC charging and the DC discharging of power storage device 10 is being performed for the sake of switching between the DC charging and the DC discharging in vehicle 1.

In each of the first and fourth states, no electric power is applied to the plurality of SMR relays included in relay device 20. Hence, SMR relay 21 or other circuits are unlikely to be greatly affected when SMR relay 21 is disconnected, for example. In each of the second and third states, the current smaller than the predetermined value is applied to the plurality of SMR relays included in relay device 20. Hence, for example, even when SMR relay 21 thus fed with the current is disconnected, large surge voltage or the like exceeding the breakdown voltage of SMR relay 21 or the ratings of other circuits is unlikely to be generated. It should be noted that the predetermined value in each of the second and third states is a value appropriately set to fall within a range in which the SMR relay or other circuits are unlikely to be greatly affected by surge voltage or the like that may be generated due to the disconnection of the SMR relay fed with electric power.

Therefore, when vehicle 1 is in one of the first to fourth states, ECU 100 disconnects one SMR relay 21 of the plurality of SMR relays included in relay device 20, and performs the offset learning for current sensor 31 corresponding to the SMR relay 21. When the offset learning for current sensor 31 is completed, SMR relay 21 is connected again. Then, when ECU 100 determines that vehicle 1 is in one of the first to fourth states, ECU 100 disconnects the next SMR relay 22, and performs the offset learning for current sensor 32 corresponding to SMR relay 22. The offset learning is similarly performed for the n current sensors.

Figure 2:
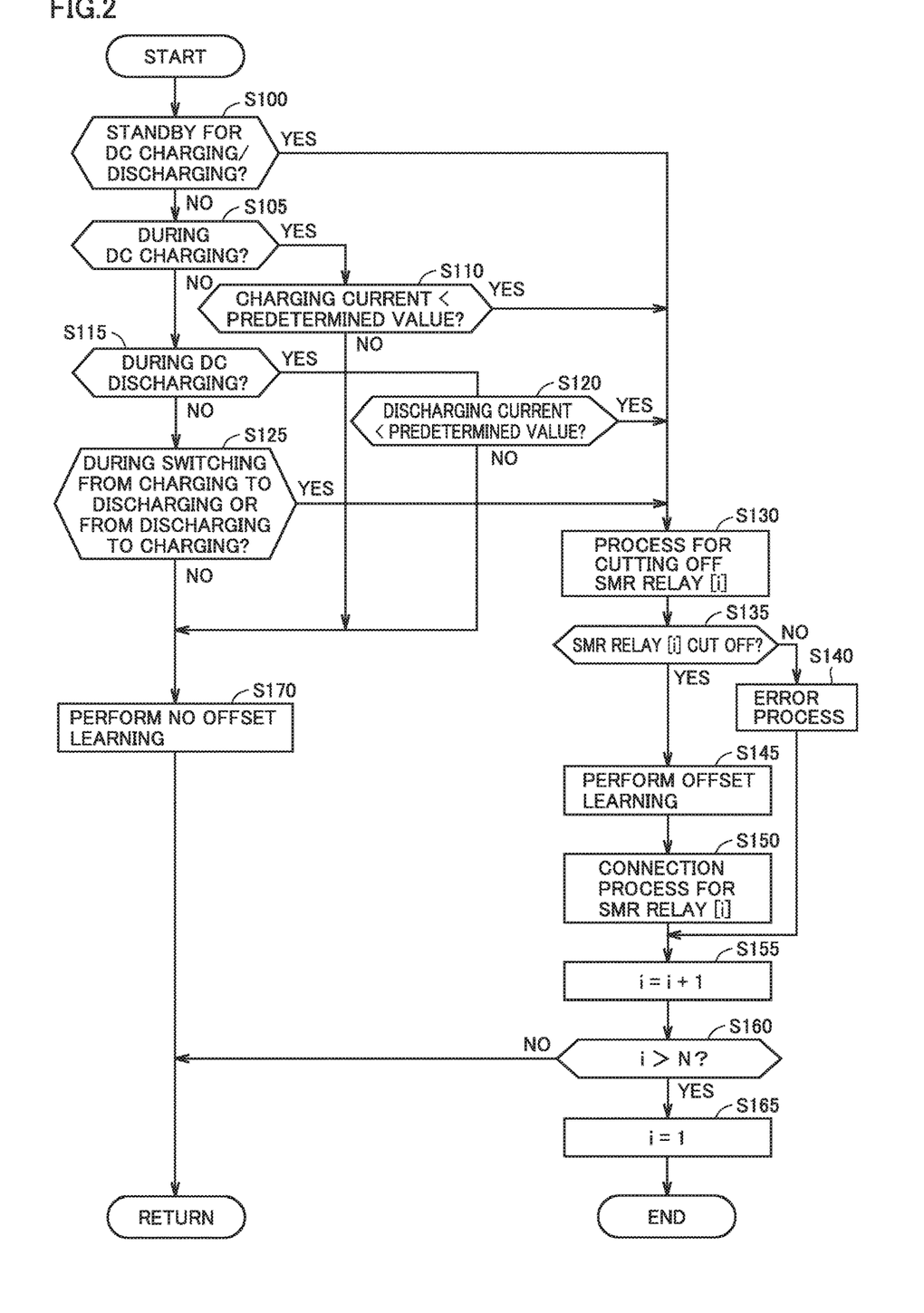
FIG. 2 is a flowchart showing a process performed by an ECU for offset learning according to the present embodiment.

FIG. 2 is a flowchart showing a process performed by ECU 100 for the offset learning according to the present embodiment. This process is performed by ECU 100 with inlet 80 and charging connector 200 being connected to each other, and is performed at a certain cycle or whenever a predetermined condition is satisfied. When ECU 100 detects the connection between inlet 80 and charging connector 200, ECU 100 brings all of the plurality of SMR relays included in relay device 20 into the close state. While each step shown in the flowchart shown in FIG. 2 is implemented by software processing done by ECU 100, a part thereof may be implemented by hardware (or electric circuit) fabricated in ECU 100.

ECU 100 performs the below-described process to the plurality of (n) current sensors included in current monitoring device 30 from one current sensor to another current sensor, thereby performing the offset learning for the plurality of current sensors. Specifically, ECU 100 performs the process shown in FIG. 2 from i=1 to i=n, i.e., the end of the process, as one cycle. In the below description with reference to FIG. 2, a case of i=i will be described.

ECU 100 determines whether or not vehicle 1 is in the first state, i.e., vehicle 1 is in the standby state for DC charging or DC discharging (S100). Specifically, for example, when ECU 100 detects connection between inlet 80 and charging connector 200. ECU 100 determines whether vehicle 1 is performing neither of the DC charging and the DC discharging. When ECU 100 determines that vehicle 1 is in the standby state in which neither of the DC charging and the DC discharging is being performed (YES in S100), ECU 100 brings the process to S130.

When ECU 100 determines that vehicle 1 is not in the standby state for the DC charging or the DC discharging (NO in S100), ECU 100 determines whether or not vehicle 1 is in the second state. First, ECU 100 determines whether or not vehicle 1 is in the state in which the DC charging is being performed (S105). When ECU 100 determines that vehicle 1 is in the state in which the DC charging is being performed (YES in S105), ECU 100 determines whether or not the magnitude of the charging current is smaller than the predetermined value (S110). When ECU 100 determines that the magnitude of the charging current is smaller than the predetermined value (YES in S110), ECU 100 brings the process to S130.

When ECU 100 determines that the magnitude of the charging current is not smaller than the predetermined value (NO in S110), ECU 100 brings the process to RETURN without performing the offset learning for current sensor [i] (S170). It should be noted that in S170, in order to continue the charging of power storage device 10, ECU 100 maintains all of the plurality of SMR relays included in relay device 20 to be in the close state.

When ECU 100 determines that vehicle 1 is not in the state in which the DC charging is being performed (NO in S105), ECU 100 determines whether or not vehicle 1 is in the third state. First, ECU 100 determines whether or not vehicle 1 is in the state in which the DC discharging is being performed (S115). When ECU 100 determines that vehicle 1 is in the state in which the DC discharging is being performed (YES in S115), ECU 100 determines whether or not the magnitude of the discharging current is smaller than the predetermined value (S120). When ECU 100 determines that the magnitude of the discharging current is smaller than the predetermined value (YES in S120), ECU 100 brings the process to S130.

When ECU 100 determines that the magnitude of the discharging current is not smaller than the predetermined value (NO in S120), ECU 100 brings the process to RETURN without performing the offset learning for current sensor [i] (S170). It should be noted that in S170, in order to continue the discharging of power storage device 10, ECU 100 maintains all of the plurality of SMR relays included in relay device 20 to be in the close state.

When ECU 100 determines that vehicle 1 is not in the state in which the DC discharging is being performed (NO in S115), ECU 100 determines whether or not vehicle 1 is in the fourth state. ECU 100 determines whether or not vehicle 1 is in the state in which no DC charging is being performed for the sake of switching from the DC charging to slier DC discharging, or determines whether or not Vehicle 1 is in the state in which no DC discharging is being performed for the sake of switching from the DC discharging to the DC charging (S125). When ECU 100 determines that vehicle 1 is in the state in which no DC charging is being performed for the sake of switching from the DC charging to the DC discharging, or determines that vehicle 1 is in the state in which no DC discharging is being performed for the sake of switching from the DC discharging to the DC charging (YES in S125), ECU 100 brings the process to S130.

When ECU 100 determines that vehicle 1 is not in the state in which no DC charging is being performed for the sake of switching from the DC charging to the DC discharging or that vehicle 1 is not in the state in which no DC discharging is being performed for the sake of switching from the DC discharging to the DC charging (NO in S125), ECU 100 brings the process to RETURN without performing the offset learning for current sensor [i] (S170).

When ECU 100 determines that vehicle 1 is in one of the first to fourth states as described above ECU 100 brings the process to S130. When ECU 100 determines that vehicle 1 is in one of the first to fourth states, ECU 100 cuts off SMR relay [i] (S130). The above process is performed because when it is determined that vehicle 1 is in one of the first to fourth states, SMR relay [i] or other circuits are unlikely to be greatly affected by the disconnection of SMR relay [i] during the supply of power.

ECU 100 determines whether or not SMR relay [i] is cut off (S135). Whether or not SMR relay [i] is cut off is determined based OD a change in the detection value of current sensor [i], for example. ECU 100 determines whether or not SMR relay [i] is cut off by determining whether or not the change between the detection values of current sensor [i] before and after sending a cutoff signal for SMR relay [i] is larger than a threshold value set in advance. When the change between the detection values of current sensor [i] before and after sending a cutoff signal for SMR relay [i] is larger than the threshold value, ECU 100 determines that SMR relay [i] is cut off, whereas when the change therebetween is not larger than the threshold value, ECU 100 determines that SMR relay [i] is not cut off. Moreover, when SMR relay [i] is provided with a monitor configured to operate in accordance with turning ON and OFF of the cutoff signal, the monitor may be used to determine whether or not SMR relay [i] is cut off. For example, in the case where a monitor signal is set to be ON in response to sending of the cutoff signal from ECU 100 to SMR relay [i] (the cutoff signal is ON), when the monitor signal is OFF even though the cutoff signal is ON, it is determined that SMR relay [i] is not cut off.

When ECU 100 determines that SMR relay [i] cannot be cut off because SMR relay [i] fails, for example, SMR relay [i] is fixed to the ON state or SMR relay [i] is in an uncontrollable state (NO in S135), ECU 100 performs an error process (S140). The error process is performed, for example, to notify to the user by way of presentation, voice, or the like, that SMR relay [i] fails, for example, SMR relay [i] is fixed to the ON state or SMR relay [i] is uncontrollable, and to perform control so as not to use assembled battery [i] corresponding to SMR relay [i]. After performing the error process, ECU 100 brings the process to S155 without performing the offset learning.

When it is determined that SMR relay [i] cannot be cut off as described above, the offset learning for current sensor [1] corresponding to SMR relay [i] is not performed due to the following reason. A precise offset value cannot be learned even if the offset learning is performed with SMR relay [i] being unable to be cut off. Therefore, the offset learning is not performed in order to suppress the offset correction from being performed for current sensor [i] using the offset value including an error.

When ECU 100 determines that SMR relay [i] is cut off (YES in S135), ECU 100 performs the offset learning (S145). Specifically, in the offset learning, ECU 100 obtains detection value IB1 of current sensor [i] with SMR relay [i] being cut off (open state), and learns this detection value IB1 as an offset value. The offset value learned here will be thereafter used for the offset correction for current sensor [i].

After performing the offset learning for current sensor [i], ECU 100 performs a connection process for SMR relay [i] to bring SMR relay [i] into the close state (S150).

In order to perform the offset learning for the next current sensor [i+1], ECU 100 performs calculation of i=1+1 (S155).

ECU 100 determines whether or not i after the calculation of S155 is larger than n (S160). When ECU 100 determines that i is not larger than n (NO in S160), ECU 100 brings the process to RETURN. When ECU 100 determines that i is larger than n (YES ID S160), ECU 100 substitutes 1 for i (i=1) and ends the process (S165). It should be noted that when the offset learning is performed continuously, ECU 100 may bring the process to RETURN after S165.

Figure 3:
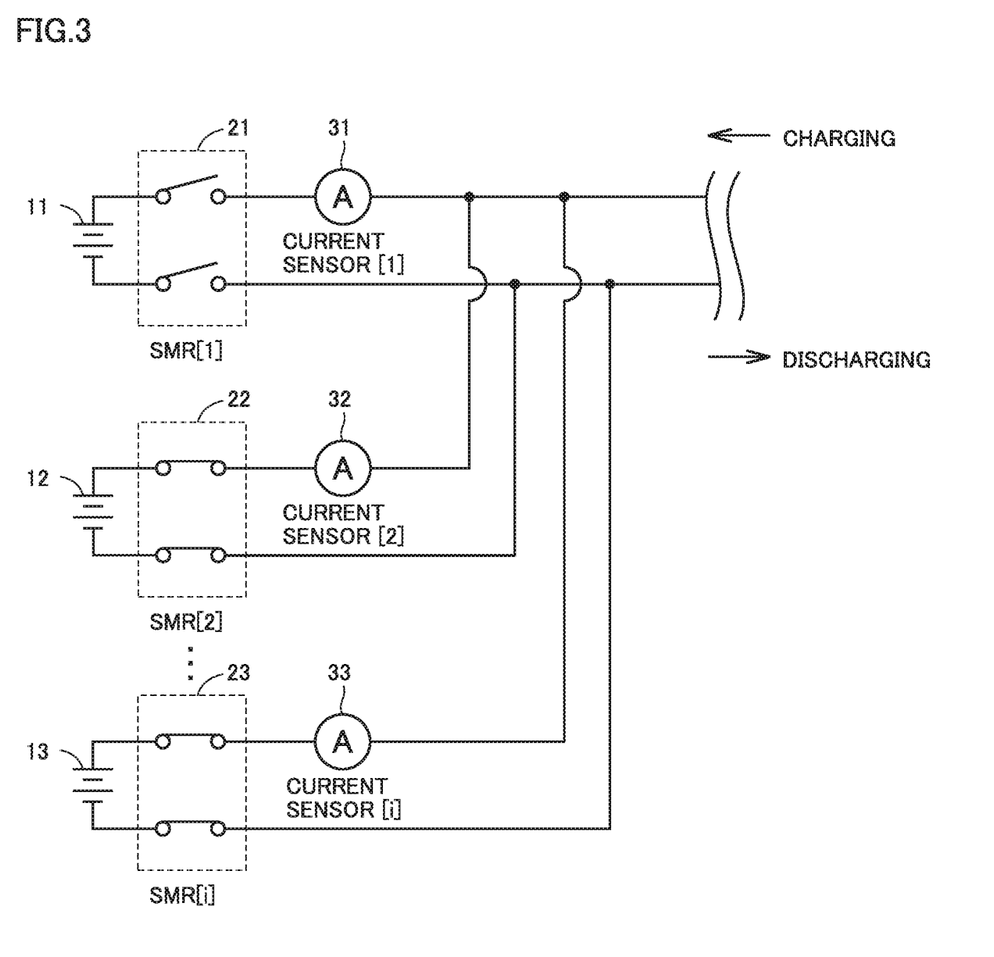
FIG. 3 is a first diagram showing a state in which the offset learning for a current sensor is being performed.

FIG. 3 shows a state in which the offset learning for current sensor 31 is being performed. When ECU 100 determines that vehicle 1 is in one of the first to fourth states, ECU 100 brings SMR relay 21 (SMR relay [1]) corresponding to i=1 into the open state. Then, ECU 100 performs the offset learning for current sensor 31 (current sensor [1]).

In the above-described case, even during the offset learning for current sensor 31, the respective SMR relays continue to be in the close state in the assembled batteries corresponding to the current sensors other than current sensor 31, whereby ECU 100 can continue the DC charging or the DC discharging.

Figure 4:
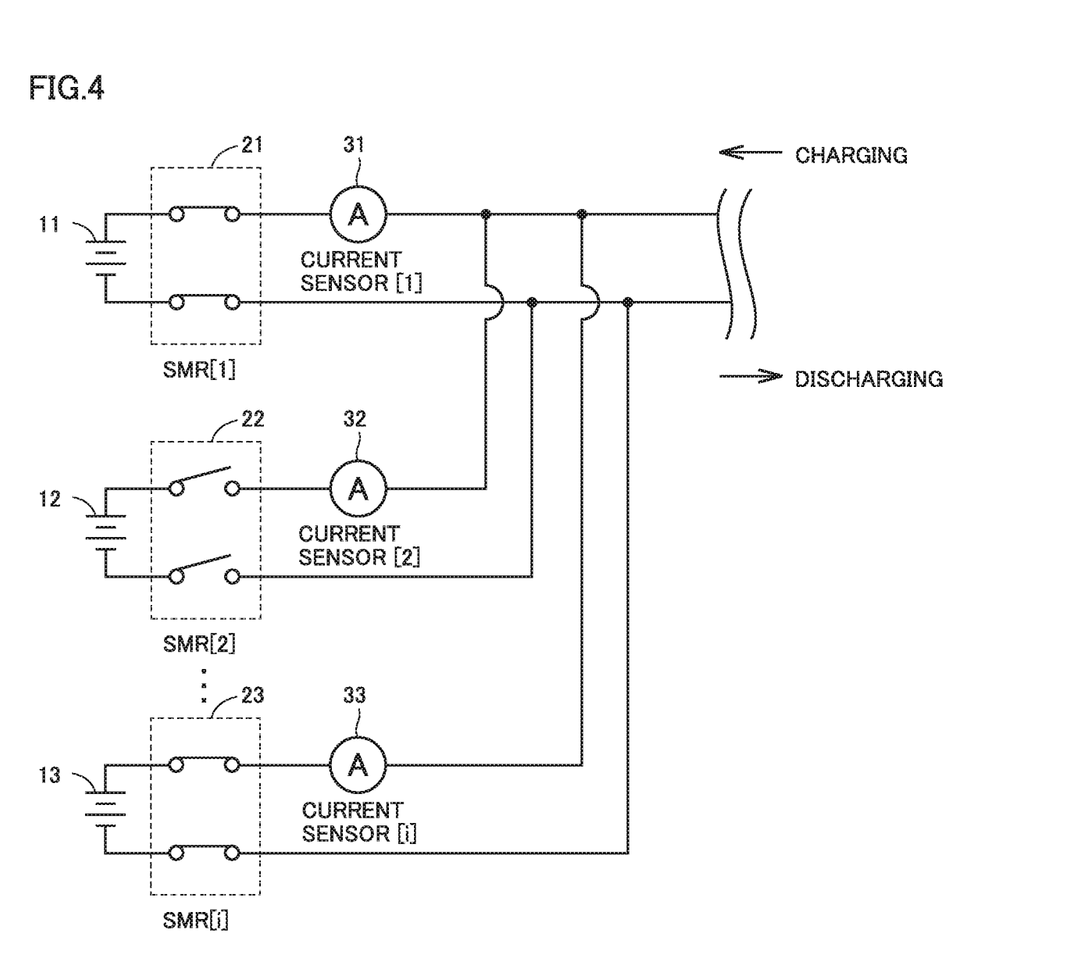
FIG. 4 is a second diagram showing a state in which the offset learning for a current sensor is being performed.

FIG. 4 shows a state in which the offset learning for current sensor 32 is performed. When the offset learning for current sensor 31 is completed, ECU 100 brings SMR relay 21 from the open state into the close state. Then, ECU 100 determines again whether or not vehicle 1 is in one of the first to fourth states. When ECU 100 determines that vehicle 1 is in one of the first to fourth states, ECU 100 brings SMR relay 22 (SMR relay [2]) corresponding to i=2 into the open state. Then, ECU 100 performs the offset learning for current sensor 32 (current sensor [2]).

Also in the above-described case, even during the offset learning for current sensor 32, the respective SMR relays continue to be in the close state in the assembled batteries corresponding to the current sensors other than current sensor 32, whereby ECU 100 can continue the DC charging or the DC discharging.

As described above, in the present embodiment, when ECU 100 determines that vehicle 1 is in one of the first to fourth states, the offset learning for the plurality of current sensors connected to inlet 80 in parallel is sequentially performed from one current sensor to another current sensor. Accordingly the offset learning can be performed without halting the DC charging or DC discharging for the assembled batteries other than the assembled battery corresponding to the current sensor being subjected to the offset learning.

Moreover, in the present embodiment, when the magnitude of the charging current or the magnitude of the discharging current is more than or equal to the predetermined value, the offset learning for the plurality of current sensors is not performed. Generally, in the case where the offset learning is performed, charging time or discharging time for power storage device 10 becomes longer than that in the case where the offset learning is not performed. Only when the charging time or discharging, time can be less affected, i.e., only when the magnitude of the charging current or the magnitude of the discharging current is less than the predetermined value, the offset learning for the plurality of current sensors is performed in order to suppress the user from feeling unpleasant because the charging time or discharging time for power storage device 10 becomes longer by performing the offset learning.

It should be noted that in the present embodiment, it has been illustratively described that the offset learning for the plurality of current sensors connected to inlet 80 in parallel is sequentially performed by ECU 100 from one current sensor to another current sensor; however, it is not limited to sequentially performing the offset learning from one current sensor to another current sensor. For example, the offset learning for the plurality of current sensors connected to inlet 80 in parallel may be sequentially performed by ECU 100 from one group of a plurality of current sensors to another group of a plurality of current sensors. Also in this case, the offset learning can be performed without halting the DC charging or DC discharging for the assembled batteries other than the assembled batteries corresponding to the current sensors being subjected to the offset learning.

Moreover, in the present embodiment, current sensor 90 is provided to detect the current flowing in power storage device 10; however, the current flowing in power storage device 10 may be calculated by summing up the detection values of the plurality of current sensors included in current monitoring device 30.

Moreover, in the present embodiment, ECU 100 uses the magnitude of detection value IB (charging current or discharging current) of current sensor 90 to determine whether to perform the offset learning; however, it is not limited to using the charging current or the discharging current.

For example, the magnitude of the charging power or the magnitude of the discharging power may be compared with predetermined power. During the external charging of power storage device 10, ECU 100 obtains information of supplied charging power from charging facility 300 via a communication device (not shown) of vehicle 1. Then, ECU 100 compares the supplied charging power with predetermined power set in advance as a magnitude of power that less affects the charging time or the discharging time even when the offset learning is performed. When the magnitude of the supplied charging power is less than the predetermined power, ECU 100 performs the offset learning, whereas when the magnitude of the supplied charging power is more than or equal to the predetermined power, ECU 100 does not perform the offset learning.

Although the present disclosure has been described and illustrated in detail, it is clearly understood that the same is by way of illustration and example only and is not to be taken, by way of limitation, the scope of the present disclosure being interpreted by the terms of the appended claims.

What is claimed is:

1. A charging device of a vehicle, the charging device comprising:
    a connector connectable to a power supply external to the vehicle;
    a power storage device including a plurality of assembled batteries connected to the connector in parallel;
    a plurality of current sensors each configured to detect current flowing in a corresponding one of the plurality of assembled batteries;
    a plurality of relays each provided between a corresponding one of the plurality of assembled batteries and a corresponding one of the plurality of current sensors; and
    an electronic control unit configured to perform offset learning to learn offset values of the plurality of current sensors, wherein
    when all of the plurality of relays are in a close state and a magnitude of charging current supplied from the power supply to the power storage device or a magnitude of discharging current supplied from the power storage device to the power supply is smaller than a predetermined value, the electronic control unit is configured to bring one or more relays of the plurality of relays into an open state and perform the offset learning for one or more current sensors corresponding to the one or more relays in the open state.

2. The charging device according to claim 1, wherein when the magnitude of the charging current or the magnitude of the discharging current is larger than the predetermined value, the electronic control unit is configured to maintain all of the plurality of relays to be in the close state without performing the offset learning.

3. The charging device according to claim 1, wherein when there is a relay unable to be brought into the open state, the electronic control unit is configured not to perform the offset learning for a current sensor corresponding to the relay unable to be brought into the open state.

* * * * *

UNITED STATES PATENT AND TRADEMARK OFFICE
CERTIFICATE OF CORRECTION

PATENT NO. : 10,886,577 B2  
APPLICATION NO. : 16/210508  
DATED : January 5, 2021  
INVENTOR(S) : Noriaki Aburai Page 1 of 2

It is certified that error appears in the above-identified patent and that said Letters Patent is hereby corrected as shown below:

In the Specification

In Column 2, Line(s) 5, delete "teaming" and insert --learning--, therefor.

In Column 3, Line(s) 6, delete "stale" and insert --state--, therefor.

In Column 3, Line(s) 14, delete "ax" and insert --are--, therefor.

In Column 3, Line(s) 20, delete ""PCU" and insert --"PCU"--, therefor.

In Column 4, Line(s) 60, delete "rioted" and insert --noted--, therefor.

In Column 4, Line(s) 64, delete "halls" and insert --halts--, therefor.

In Column 5, Line(s) 6, after "states", delete "." and insert --,--, therefor.

In Column 6, Line(s) 16, after "200", delete "." and insert --,--, therefor.

In Column 7, Line(s) 2, delete "slier" and insert --the--, therefor.

In Column 7, Line(s) 22, after "above", insert --,--.

In Column 7, Line(s) 32, delete "OD" and insert --on--, therefor.

In Column 7, Line(s) 66, after "sensor", delete "[1]" and insert --[i]--, therefor.

In Column 8, Line(s) 18, delete "i=1+1" and insert --i=i+1--, therefor.

In Column 8, Line(s) 24, after "YES", delete "ID" and insert --in--, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*

In Column 8, Line(s) 61, after "Accordingly", insert --,--.

In Column 9, Line(s) 7, after "discharging", delete ",".

In Column 10, Line(s) 9, after "taken", delete ",".